(12) United States Patent
Morgan-Mar et al.

(10) Patent No.: US 10,026,183 B2
(45) Date of Patent: Jul. 17, 2018

(54) METHOD, SYSTEM AND APPARATUS FOR DETERMINING DISTANCE TO AN OBJECT IN A SCENE

(71) Applicant: CANON KABUSHIKI KAISHA

(72) Inventors: David Peter Morgan-Mar, Wollstonecraft (AU); Matthew Raphael Arnison, Umina Beach (AU)

(73) Assignee: Canon Kabushiki Kaisha, Tokyo (JP)

( * ) Notice: Subject to any disclaimer, the term of this patent is extended or adjusted under 35 U.S.C. 154(b) by 99 days.

(21) Appl. No.: 15/142,474

(22) Filed: Apr. 29, 2016

(65) Prior Publication Data

US 2016/0321819 A1    Nov. 3, 2016

(30) Foreign Application Priority Data

May 1, 2015    (AU) .................................. 2015202286

(51) Int. Cl.
*G06K 9/00*    (2006.01)
*G06T 7/00*    (2017.01)
*G06T 7/571*    (2017.01)
*G06T 7/262*    (2017.01)

(52) U.S. Cl.
CPC ............ *G06T 7/0069* (2013.01); *G06T 7/262* (2017.01); *G06T 7/571* (2017.01); *G06T 2207/10016* (2013.01); *G06T 2207/20056* (2013.01); *G06T 2207/30196* (2013.01)

(58) Field of Classification Search
CPC ........ G06T 7/0069; G06T 7/262; G06T 7/751
See application file for complete search history.

(56) References Cited

U.S. PATENT DOCUMENTS

| | | | |
|---|---|---|---|
| 5,193,124 A | 3/1993 | Subbarao | |
| 6,148,120 A | 11/2000 | Sussman | |
| 8,089,515 B2 | 1/2012 | Chebil et al. | |
| 8,358,833 B2 | 1/2013 | Sahay et al. | |
| 8,436,912 B2 | 5/2013 | Kane et al. | |
| 8,542,313 B2 | 9/2013 | Rapaport et al. | |
| 8,718,357 B2 | 5/2014 | Sahay et al. | |
| 9,117,277 B2 | 8/2015 | Morgan-Mar et al. | |
| 2007/0036427 A1 | 2/2007 | Nakamura et al. | |
| 2013/0063566 A1 | 3/2013 | Morgan-Mar et al. | |

(Continued)

OTHER PUBLICATIONS

Myles. Zarina, "Depth from defocused motion", PhD diss., University of Central Florida Orlando, Florida, Fall Term, Dec. 2004, p. 74-75.

(Continued)

*Primary Examiner* — Duy M Dang
(74) *Attorney, Agent, or Firm* — Canon USA, Inc. I.P. Division

(57) ABSTRACT

A method of determining at least two motion values of an object moving axially in a scene. A first and second image of the object in the scene is captured with an image capture device. The object is axially displaced in the scene between the captured images with respect to a sensor plane of the image capture device. A variation in blur between the first and second captured images is determined. A scale change of the object between the first and second captured images is determined. Using the determined scale change and variation in blur, at least two motion values of the object in the scene are determined. The motion values identify the depths of the object in the first and second captured images and axial motion of the object in the scene.

11 Claims, 9 Drawing Sheets

(56) References Cited

U.S. PATENT DOCUMENTS

2013/0121537 A1    5/2013   Monobe et al.
2015/0178935 A1    6/2015   Morgan-Mar et al.

OTHER PUBLICATIONS

Deschenes, et al., "An unified approach for a simultaneous and cooperative estimation of defocus blur and spatial shifts", Technical Report No. 261, Image and Vision Computing 22, No. 1 (2004), p. 35-57.

METHOD, SYSTEM AND APPARATUS FOR DETERMINING DISTANCE TO AN OBJECT IN A SCENE

REFERENCE TO RELATED PATENT APPLICATION(S)

This application claims the benefit under 35 U.S.C. § 119 of the filing date of Australian Patent Application No. 2015202286, filed May 1, 2015, hereby incorporated by reference in its entirety as if fully set forth herein.

TECHNICAL FIELD

The present invention relates generally to digital image processing and, in particular, to determining the distance to an object from a digital image of a scene. The present invention also relates to a method, apparatus and system for determining at least two motion values of an object moving axially in a scene. The present invention also relates to a computer program product including a computer readable medium having recorded thereon a computer program for determining at least two motion values of an object moving axially in a scene.

BACKGROUND

In many applications of image capture, the distance from an image capture device (e.g., a digital camera, a video camera, a camera phone, a laptop computer, a tablet computer) to objects within the field of view of the image capture device can be advantageously determined. A collection of such distances to objects in an imaged scene is sometimes referred to as a depth map. A depth map of an imaged scene may be represented as an image, which may be of a different pixel resolution to the image of the scene itself, in which the distance to objects corresponding to each pixel of the depth map is represented by a greyscale or colour value.

A depth map can be useful in a number of applications including photography and video capture, as the depth map enables several desirable post-capture image processing capabilities for photographs or video streams. For example, a depth map can be used to segment foreground and background objects in a digital image to allow manual post-processing, or the automated application of creative photographic or video special effects.

Several features are desirable in any method of acquiring a depth map. Depth accuracy is important; otherwise, the resulting depth map may suggest that objects are at distances significantly different to their true distances. Depth resolution is important to allow the separation of objects that may be spatially close to one another in the scene and also to allow for accurate post-processing operations. Spatial resolution of the depth map is also important in many applications and, in particular, depth maps approaching the resolution of the images themselves are useful for pixel-wise segmentation and avoiding visually obvious object boundary errors in many post-processing operations. A tolerance to subject or camera motion is highly desirable, especially in video applications where the subjects and the camera are likely to be moving during image capture. Desirably, depth mapping methods can be realised in practical devices, such as cameras, with minimal additional cost, bulk, weight, image capture and processing time, and power consumption. Several methods are known for determining a depth map from images of a scene. So-called active depth mapping methods involve projecting beams or patterns of light or other radiation onto a scene. Active methods require projection optics, which add significant cost, weight, and power requirements. In addition, active methods have limited range and may add unwanted light to a scene in which the lighting must be carefully controlled for artistic effect.

So-called passive depth mapping methods, in contrast to active methods, rely only on ambient light in a scene. One method, stereo imaging, uses multiple cameras to determine depth using the stereoscopic effect. Stereo imaging has disadvantages related to multiple viewpoints, equipment cost, difficulty of alignment, and object occlusion. Another method, depth from focus, uses multiple shots from a single camera at many different focus positions. Depth from focus has the significant disadvantage of requiring a relatively long scan through focus, making the depth from focus method impractical for video frame rates or scenes containing moving objects. Another method, depth from defocus (DFD), uses a small number of images shot at different focus positions and extracts depth information from variation in blur with object distance.

Several different depth from defocus (DFD) methods are known. Such depth from defocus (DFD) methods typically rely on correspondences between regions of pixels in multiple images of the same scene to extract depth information about the object imaged at that image region. The depth information is extracted by quantifying the amount of blur difference between the images of an object. For a static object and camera, the blur difference is caused by a change in the focal quality of the image captures, which is governed by a change in parameters of the camera, such as focus, aperture, or zoom. However, if the depth of an object changes between the image captures, due to the object or the camera or both moving axially, then an additional change in focal quality and hence blur is caused by the axial motion. If standard depth from defocus (DFD) methods are applied, the additional change in blur causes the methods to give an incorrect depth estimate to the object. Furthermore, the additional change in blur cannot be disambiguated from the change in blur caused by the change in parameters, so standard depth from defocus (DFD) methods cannot compensate for the additional change in blur caused by axial motion. The parameters including focus, aperture, or zoom, may be referred to as "camera parameters" or "image capture device parameters".

Some existing depth mapping methods can measure depths of axially moving objects. However, the depth mapping methods that measure depths of axially moving objects disadvantageously require the additional cost and size of either active projection or stereo imaging, or camera modifications such as coded apertures which interfere with standard imaging.

Some existing depth mapping methods make use of a moving camera to measure the depth of an object, using techniques such as axial parallax or joint solutions for blur and apparent affine motion. Such methods solve for depth under the condition of relative axial motion between the camera and object. However, the depth mapping methods that make use of a moving camera to measure the depth of an object require knowledge of the amount of motion of the camera relative to a stationary object, and cannot determine the depth of an object which moves by an unknown amount.

Some existing depth mapping methods attempt to treat axial motion and the apparent change in size of an object in different images by warping the images to compensate for the change in size of the object. However, the depth mapping methods that warp the images to compensate for the change in size of the object address only the change in size of an axially moving object, and not the change in focal blur caused by the motion. If applied to axially moving objects, the depth mapping methods that warp the images are biased by the axial motion and produce an incorrect depth estimate of the moving object.

SUMMARY

It is an object of the present invention to substantially overcome, or at least ameliorate, one or more disadvantages of existing arrangements.

According to one aspect of the present disclosure, there is provided a method of determining at least two motion values of an object moving axially in a scene, said method comprising:

capturing a first and second image of the object in the scene with an image capture device, wherein said object is axially displaced in the scene between the captured images with respect to a sensor plane of the image capture device;

determining a variation in blur between said first and second captured images;

determining a scale change of the object between said first and second captured images;

determining, using the determined scale change and variation in blur, at least two motion values of the object in the scene, wherein said motion values identify the depths of the object in the first and second captured images and axial motion of the object in the scene.

According to another aspect of the present disclosure, there is provided a system for determining at least two motion values of an object moving axially in a scene, said system comprising:

a memory for storing data and a computer program;

a processor coupled to said memory for executing said computer program, said computer program comprising instructions for:

capturing a first and second image of the object in the scene with an image capture device, wherein said object is axially displaced in the scene between the captured images with respect to a sensor plane of the image capture device;

determining a variation in blur between said first and second captured images;

determining a scale change of the object between said first and second captured images;

determining, using the determined scale change and variation in blur, at least two motion values of the object in the scene, wherein said motion values identify the depths of the object in the first and second captured images and axial motion of the object in the scene.

According to still another aspect of the present disclosure, there is provided an apparatus for determining at least two motion values of an object moving axially in a scene, said apparatus comprising:

means for capturing a first and second image of the object in the scene with an image capture device, wherein said object is axially displaced in the scene between the captured images with respect to a sensor plane of the image capture device;

means for determining a variation in blur between said first and second captured images;

means for determining a scale change of the object between said first and second captured images; and means for determining, using the determined scale change and variation in blur, at least two motion values of the object in the scene, wherein said motion values identify the depths of the object in the first and second captured images and axial motion of the object in the scene.

According to still another aspect of the present disclosure, there is provided a computer readable medium having a computer program stored thereon for determining at least two motion values of an object moving axially in a scene, said program comprising:

code for capturing a first and second image of the object in the scene with an image capture device, wherein said object is axially displaced in the scene between the captured images with respect to a sensor plane of the image capture device;

code for determining a variation in blur between said first and second captured images;

code for determining a scale change of the object between said first and second captured images; and code for determining, using the determined scale change and variation in blur, at least two motion values of the object in the scene, wherein said motion values identify the depths of the object in the first and second captured images and axial motion of the object in the scene.

Other aspects are also disclosed.

BRIEF DESCRIPTION OF THE DRAWINGS

One or more embodiments of the invention will now be described with reference to the following drawings, in which.

DETAILED DESCRIPTION INCLUDING BEST MODE

The arrangements presently disclosed may be implemented on a variety of hardware platforms, including in an image capture device (e.g., a digital camera, a video camera, a camera phone, a laptop computer, a tablet computer), a general purpose computer (PC), or on a cloud based computer implementation.

Figure 1A:
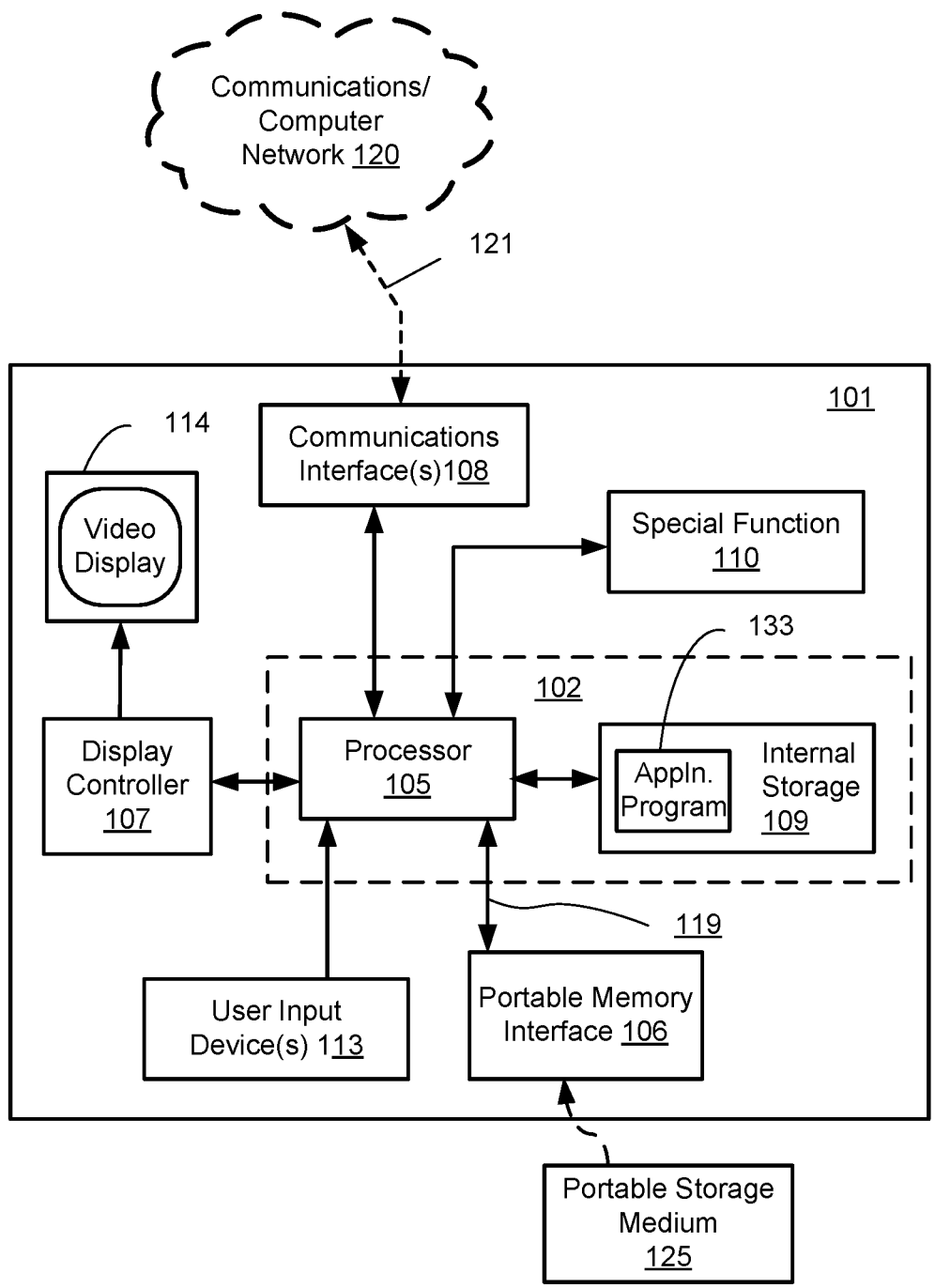
FIGS. 1A and 1B form a schematic block diagram of a general purpose computer on which the arrangements described may be practised.
Figure 1B:
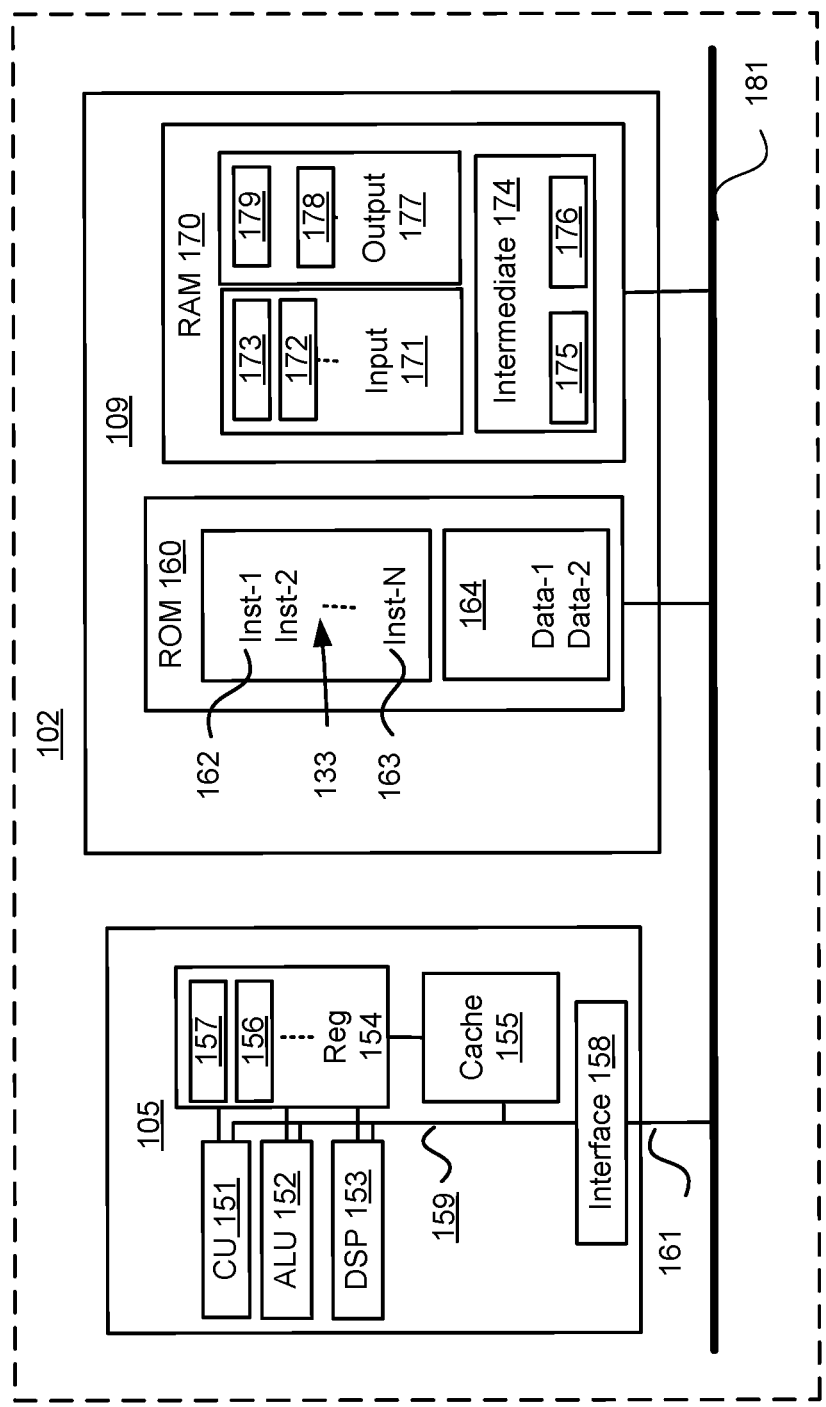

FIGS. 1A and 1B collectively form a schematic block diagram of an image capture device 101 including embedded components, upon which the methods to be described are desirably practised. The device 101 may be, for example, a digital camera, a video camera, a camera phone, a laptop computer, or a tablet computer, in which processing resources are limited. Nevertheless, the methods to be described may also be performed on higher-level devices such as desktop computers, server computers, and other such devices with significantly larger processing resources.

As seen in FIG. 1A, the device 101 comprises an embedded controller 102. Accordingly, the device 101 may be referred to as an "embedded device." In the present example, the controller 102 has a processing unit (or processor) 105 which is bi-directionally coupled to an internal storage module 109. The storage module 109 may be formed from non-volatile semiconductor read only memory (ROM) 160 and semiconductor random access memory (RAM) 170, as seen in FIG. 1B. The RAM 170 may be volatile, non-volatile or a combination of volatile and non-volatile memory.

The device 101 includes a display controller 107, which is connected to a video display 114, such as a liquid crystal display (LCD) panel or the like. The display controller 107 is configured for displaying graphical images on the video display 114 in accordance with instructions received from the embedded controller 102, to which the display controller 107 is connected.

The device 101 also includes user input devices 113 which are typically formed by keys, a keypad or like controls. In some implementations, the user input devices 113 may include a touch sensitive panel physically associated with the display 114 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 1A, the device 101 also comprises a portable memory interface 106, which is coupled to the processor 105 via a connection 119. The portable memory interface 106 allows a complementary portable memory device 125 to be coupled to the device 101 to act as a source or destination of data or to supplement the internal storage module 109. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The device 101 also has a communications interface 108 to permit coupling of the device 101 to a computer or communications network 120 via a connection 121. The connection 121 may be wired or wireless. For example, the connection 121 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

Typically, the device 101 is configured to perform some special function. The embedded controller 102, possibly in conjunction with further special function components 110, is provided to perform that special function. For example, where the device 101 is a digital camera, the components 110 may represent a lens, focus control and image sensor of the digital camera. The special function components 110 are connected to the embedded controller 102. As another example, the device 101 may be a mobile telephone handset including a camera. In this instance, the components 110 may also represent those components required for communications in a cellular telephone environment. Where the device 101 is a portable device, the special function components 110 may also represent a number of encoders and decoders of a type including Joint Photographic Experts Group (JPEG), (Moving Picture Experts Group) MPEG, MPEG-1 Audio Layer 3 (MP3), and the like.

The methods described hereinafter may be implemented using the embedded controller 102, where the processes of FIGS. 4 to 7 may be implemented as one or more software application programs 133 executable within the embedded controller 102. The device 101 of FIG. 1A implements the described methods. In particular, with reference to FIG. 1B, the steps of the described methods are effected by instructions in the software 133 that are carried out within the controller 102. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 133 of the embedded controller 102 is typically stored in the non-volatile ROM 160 of the internal storage module 109. The software 133 stored in the ROM 160 can be updated when required from a computer readable medium. The software 133 can be loaded into and executed by the processor 105. In some instances, the processor 105 may execute software instructions that are located in RAM 170. Software instructions may be loaded into the RAM 170 by the processor 105 initiating a copy of one or more code modules from ROM 160 into RAM 170. Alternatively, the software instructions of one or more code modules may be pre-installed in a non-volatile region of RAM 170 by a manufacturer. After one or more code modules have been located in RAM 170, the processor 105 may execute software instructions of the one or more code modules.

The application program 133 is typically pre-installed and stored in the ROM 160 by a manufacturer, prior to distribution of the device 101. However, in some instances, the application programs 133 may be supplied to the user encoded on one or more CD-ROM (not shown) and read via the portable memory interface 106 of FIG. 1A prior to storage in the internal storage module 109 or in the portable memory 125. In another alternative, the software application program 133 may be read by the processor 105 from the network 120, or loaded into the controller 102 or the portable storage medium 125 from other computer readable media. Computer readable storage media refers to any non-transitory tangible storage medium that participates in providing instructions and/or data to the controller 102 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 101. Examples of transitory or non-tangible computer readable transmission media that may also participate in the provision of software, application programs, instructions and/or data to the device 101 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 133 and the corresponding code modules mentioned above may be executed to implement one or more graphical user interfaces (GUIs) to be rendered or otherwise represented upon the display 114 of FIG. 1A. Through manipulation of the user input device 113 (e.g., the keypad), a user of the device 101 and the application programs 133 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 1B illustrates in detail the embedded controller 102 having the processor 105 for executing the application programs 133 and the internal storage 109. The internal storage 109 comprises read only memory (ROM) 160 and random access memory (RAM) 170. The processor 105 is able to execute the application programs 133 stored in one or both of the connected memories 160 and 170. When the device 101 is initially powered up, a system program resident in the ROM 160 is executed. The application program 133 permanently stored in the ROM 160 is sometimes referred to as "firmware". Execution of the firmware by the processor 105 may fulfil various functions, including processor management, memory management, device management, storage management and user interface.

The processor 105 typically includes a number of functional modules including a control unit (CU) 151, an arithmetic logic unit (ALU) 152, a digital signal processor (DSP) 1153 and a local or internal memory comprising a set of registers 154 which typically contain atomic data elements 156, 157, along with internal buffer or cache memory 155. One or more internal buses 159 interconnect these functional modules. The processor 105 typically also has one or more interfaces 158 for communicating with external devices via system bus 181, using a connection 161.

The application program 133 includes a sequence of instructions 162 through 163 that may include conditional branch and loop instructions. The program 133 may also include data, which is used in execution of the program 133. This data may be stored as part of the instruction or in a separate location 164 within the ROM 160 or RAM 170.

In general, the processor 105 is given a set of instructions, which are executed therein. This set of instructions may be organised into blocks, which perform specific tasks or handle specific events that occur in the device 101. Typically, the application program 133 waits for events and subsequently executes the block of code associated with that event. Events may be triggered in response to input from a user, via the user input devices 113 of FIG. 1A, as detected by the processor 105. Events may also be triggered in response to other sensors and interfaces in the device 101.

The execution of a set of the instructions may require numeric variables to be read and modified. Such numeric variables are stored in the RAM 170. The disclosed method uses input variables 171 that are stored in known locations 172, 173 in the memory 170. The input variables 171 are processed to produce output variables 177 that are stored in known locations 178, 179 in the memory 170. Intermediate variables 174 may be stored in additional memory locations in locations 175, 176 of the memory 170. Alternatively, some intermediate variables may only exist in the registers 154 of the processor 105.

The execution of a sequence of instructions is achieved in the processor 105 by repeated application of a fetch-execute cycle. The control unit 151 of the processor 105 maintains a register called the program counter, which contains the address in ROM 160 or RAM 170 of the next instruction to be executed. At the start of the fetch execute cycle, the contents of the memory address indexed by the program counter is loaded into the control unit 151. The instruction thus loaded controls the subsequent operation of the processor 105, causing for example, data to be loaded from ROM memory 160 into processor registers 154, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 133, and is performed by repeated execution of a fetch-execute cycle in the processor 105 or similar programmatic operation of other independent processor blocks in the device 101.

The described methods may alternatively be implemented in whole or part in dedicated hardware such as one or more integrated circuits performing the functions or sub functions to be described. Such dedicated hardware may include graphic processors, digital signal processors, or one or more microprocessors and associated memories. For example, the image capture device 101 (e.g., a digital camera) may implement depth from defocus (DFD) algorithmic processes to be described in hardware or firmware to capture pairs of images with different parameters of the image capture device. The image capture device 101 may also implement the algorithmic processes to process the captured images to provide a depth map for various purposes. Such purposes may include artificially blurring the background of portrait photos to achieve a pleasing aesthetic, or attaching depth information as image metadata to enable various post-processing operations.

In an arrangement where the described depth from defocus (DFD) algorithmic processes are implemented by the image capture device 101, the hardware of the image capture device may capture multiple images of a scene, the images being suitable for application of depth from defocus (DFD) processes, where the processing occurs in embedded devices of the image capture device 101. Results of the depth from defocus (DFD) processing may be retained in a memory of the image capture device 101, written to a memory card or other memory storage device connectable to the image capture device 101, or uploaded to a cloud computing server for later retrieval by the user.

In another example, a desktop computer or the like may implement the described depth from defocus (DFD) processing in software to enable post-capture processing of photos to generate depth estimates, which a user can use for image segmentation or further image processing operations. The image capture device 101 may capture multiple images of a scene in a traditional fashion, the images being suitable for application of the described depth from defocus (DFD) processes, and the images are retained in memory or written to a memory card or other memory storage device. At a later time, the images captured by the image capture device 101 may be transferred to the computer, where subsequent steps of the depth from defocus (DFD) process use the transferred images as input.

In yet another example, a cloud computing server or the like may implement the described depth from defocus (DFD) processes in software to enable post-capture processing of photos to generate depth estimates. In an arrangement where the cloud computing server is implementing the described depth from defocus (DFD) processes, the image capture device 101 captures multiple images of a scene in a traditional fashion. The images are uploaded to the cloud computing server, where subsequent steps of the described depth from defocus (DFD) processes use the uploaded images as input. The cloud computing server produces the depth maps and possibly additionally processed images and may then download the depth maps and additional images back to the image capture device, or store the depth maps and additional images for later retrieval by the user.

Other implementations may capture two or more images, the images being suitable for application of the described depth from defocus (DFD) processes. In the case of some parameters, such as zoom and focus and, potentially other parameters, the magnification of the captured images may be different. In the case where magnification of the captured images is different one or more of the images may be scaled to bring the images substantially into registration before applying the described depth from defocus (DFD) processes to determine a depth map.

Figure 2A:
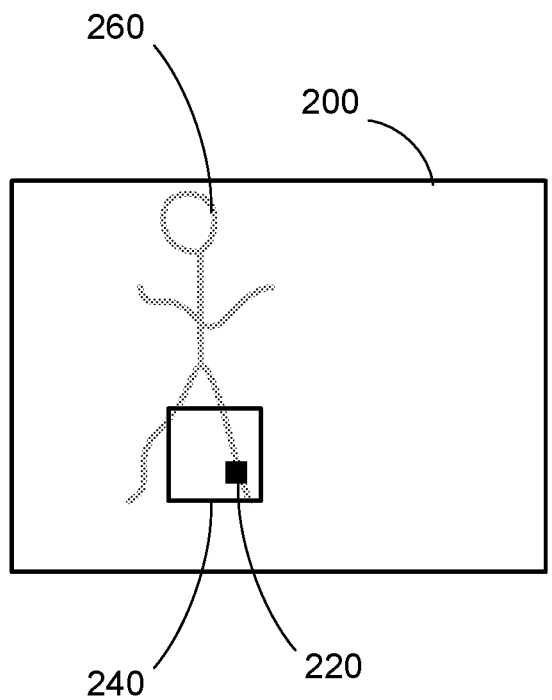
FIGS. 2A and 2B are diagrams showing the correspondence between pixels and image patches within a first image and a second image of a scene.

The described methods may be used for determining a depth measurement from two images of the same scene. The described methods use an optical blur difference. The images are captured using the image capture device 101, such as a digital camera. As an example, consider a patch $f_0$ of the scene to be imaged, the patch being small enough that any variation in object depth or point spread function (PSF) of the imaging system within the patch is small and thus can be ignored. The two-dimensional intensity distribution of the corresponding patch of an image $f_1$ 240 of the intensity distribution of the scene patch $f_0$, as seen in FIG. 2A, can be modelled using a fully general point spread function (PSF) by a spatial convolution operation in accordance with Equation (1), as follows:

$$f_1(x,y) = f_0(x,y) \otimes PSF_1(x,y), \quad (1)$$

where $PSF_1$ is the defocus blur point spread function (PSF) of the scene patch $f_0$ when the scene patch is projected on to the image patch $f_1$ 240 by the optics of the image capture device (e.g., a camera). Taking the Fourier transform of both sides of Equation (1) gives Equation (2), as follows:

$$F_1(u,v) = F_0(u,v) OTF_1(u,v) \quad (2)$$

where (u, v) are spatial frequency coordinates, $F_1$ is the Fourier transform of $f_1$, $F_0$ is the Fourier transform of $f_0$, and $OTF_1$ is the Fourier transform of $PSF_1$. By the Fourier convolution theorem the spatial convolution operation has become a product. The function $OTF_1$ is known as the optical transfer function (OTF). The optical transfer function (OTF) is a complex-valued function, with modulus and phase components.

Assume two images of the same scene are captured with different parameters (i.e., camera parameters) of the image capture device 101 used to capture the two images, but without moving the image capture device 127 or any objects in the scene so that the images are in alignment with one another. The parameters of the image capture device 101 that may be varied include, but are not limited to, focus, aperture, or zoom, any of which may vary the optical transfer function (OTF) of the image capture device 101. The relationship between the image patches in the two images of the scene, will now be described with reference to FIG. 2. FIG. 2 shows a first image 200 of a scene and a second image 210 of the same scene. The scene contains an object 260. A selected pixel 220 in the first image 200 is highlighted and a corresponding selected pixel 230 in the second image 210 is highlighted. The correspondence is such that the selected pixel 220 in the first image 200 and the selected pixel 230 in the second image 210 largely correspond to the same point on an object 260 in the scene being imaged. The first image patch 240 is from the first image 200 and is referred to as $f_1$. The second image patch 250 is from the second image 210 and is referred to as $f_2$. Thus, corresponding image patches 240 and 250 are identified from the captured images 200 and 210. The patches 240 and 250 are the same size to ensure appropriate comparison of image content contained n the patches 240 and 250. The patches 240 and 250 contain the selected pixels 220 and 230 at corresponding pixel coordinates within the patches 240 and 250.

The second image patch $f_2$ 250 of the same scene patch $f_0$ may be modelled in the same way as Equation (1), replacing the "1" subscripts with "2" subscripts. Taking the ratio of the Fourier transforms of corresponding patches in the two images gives Equation (3), as follows:

$$\frac{F_1(u,v)}{F_2(u,v)} = \frac{OTF_1(u,v)}{OTF_2(u,v)}, \quad (3)$$

where the Fourier transform $F_0(u, v)$ of the scene is common to the numerator and denominator of the right hand side and has been cancelled from the ratio. The ratio of the Fourier transforms as defined by Equation (3) defined above may be called the spectral ratio. When no noise is present, the spectral ratio is scene independent because all contributions of the scene have been cancelled out. In the presence of imaging or quantisation noise, the cancellation may not be perfect, and the spectral ratio may be biased by the noise. It can be shown that the shape of the spectral ratio depends on the camera parameters (e.g., focal length, aperture, focus position, ISO speed, or zoom) used to capture each image, and the distance d of the imaged object from the image capture device 101, also known as the depth of the object. Thus, the depth d of an object can be estimated from the spectral ratio.

In general, the camera parameters used to capture the first image 200 and the second image 210 are different. The difference in camera parameters between the two images causes a variation in the defocus blur of objects imaged in the two images. At least a portion of the variation in blur is caused by a change in parameters of the image capture device 101 between capturing the first image 200 and the second image 210. Such a change in focus may be termed a focus bracket. In particular, the focus bracket or the component of the focus bracket caused by the change in camera parameters between the captures may be termed the camera focus bracket. The overall focus bracket may or may not be equal to the camera focus bracket. The camera focus bracket may be characterised by a change in the focus setting of the camera between the two images, or by a change in aperture, or by a change in zoom, or by a change in some other parameter that affects focus. The details of the camera focus bracket may be known a priori, as the camera parameters may be known at capture time and the change in focus resulting from any change in camera parameters may be determined from knowledge of the camera parameters.

The relationship between the spectral ratio and the depth d of the object 260 being imaged depends on the focus bracket used to capture the images 200 and 210 of that object. Thus to determine the depth d of the object 260 from the spectral ratio, the focus bracket used to capture the images 200 and 210 is required. If the object 260 has not moved between the two exposures used to capture the images 200 and 210, and the image capture device 101 (e.g., camera) itself has not moved between the two exposures, then the focus bracket depends only on the change in camera parameters between the captures, so is equal to the focus bracket of the image capture device 101. In this case, the depth d to the object 260 may be determined by characterising the spectral ratio with a numerical measure a of shape of the spectral ratio and then referring to a calibration of the numerical measure a with respect to depth d, where the calibration depends on the camera focus bracket.

Characterising the shape of the spectral ratio as a numerical measure a may be done by any of several methods. One example method of characterising the shape of the spectral ratio as a numerical measure is to calculate the mean value of the real part of the spectral ratio samples across a specified range of spatial frequencies. The spectral ratio samples are complex numbers in general.

Another example method of characterising the shape of the spectral ratio as a numerical measure is to fit a suitably parameterised circularly symmetrical function to the real part of the spectral ratio samples across a specified range of spatial frequencies. Suitable circularly symmetrical functions may include a quadratic function of the radial spatial frequency $q=\sqrt{u^2+v^2}$ (e.g., a function of the form $1+aq^2$), where the fitted coefficient a is taken as the numerical measure characterising the spectral ratio. Other suitable functions may include suitably parameterised Gaussian or other functions.

A further example method of characterising the shape of the spectral ratio as a numerical measure is to produce locally sampled spatial frequency strength estimates by the application of a set of suitably chosen frequency domain Gabor filters. The spatial frequency strengths can then be fitted with a circularly symmetrical function across a specified range of spatial frequencies. Suitable circularly symmetrical functions may include a quadratic function of the radial spatial frequency $q=\sqrt{u^2+v^2}$. For example, a function of the form $1+aq^2$ may be used, where the coefficient a is taken as the numerical measure characterising the spectral ratio. Other suitable functions may include suitably parameterised Gaussian or sinc functions.

In further examples, any of the above methods of characterising the shape of the spectral ratio as a numerical measure may be weighted, such as calculating a weighted mean of sample values, or performing weighted fitting of samples or spatial frequency strength estimates to suitable circularly symmetrical functions. To perform such weighting, the spatial frequency samples in the spectral ratio are assigned weights. The spectral ratio weights are numbers, typically in the range 0 to 1, assigned so that each sample has its own weight. One method of weighting the samples in the spectral ratio is to assign a weight of one (1) to samples where the phase of the spectral ratio is less than a predetermined threshold ε and a weight of zero (0) to samples where the phase of the spectral ratio is greater than or equal to the predetermined threshold ε. The effect of such a weighting is to reduce the weight of samples with a low signal-to-noise ratio relative to samples with high signal-to-noise-ratio. Other methods of weighting the samples of the spectral ratio may also be used. For example, the samples may be assigned a weight of zero (0) if the spatial frequency of the samples falls outside the spatial frequency support cut-off of the camera aperture. In another example, the samples may be weighted based on a function of their spatial frequency, such as a Gaussian function, assigned high weights to lower spatial frequencies and low weights to higher spatial frequencies. Other weighting methods may combine one or more aspects or variations of all of the above described weighting methods.

The above description applies when the scene is captured without moving the image capture device 101 or any objects in the scene, so that the images are in alignment with one another. If the image capture device 101 or object 260 in the scene moves laterally between exposures, a translational misalignment between the patches 240 and 250 occurs. Such translational misalignment may be dealt with, more or less successfully, using image alignment methods to bring the image patches 240 and 250 into registration.

Figure 3:
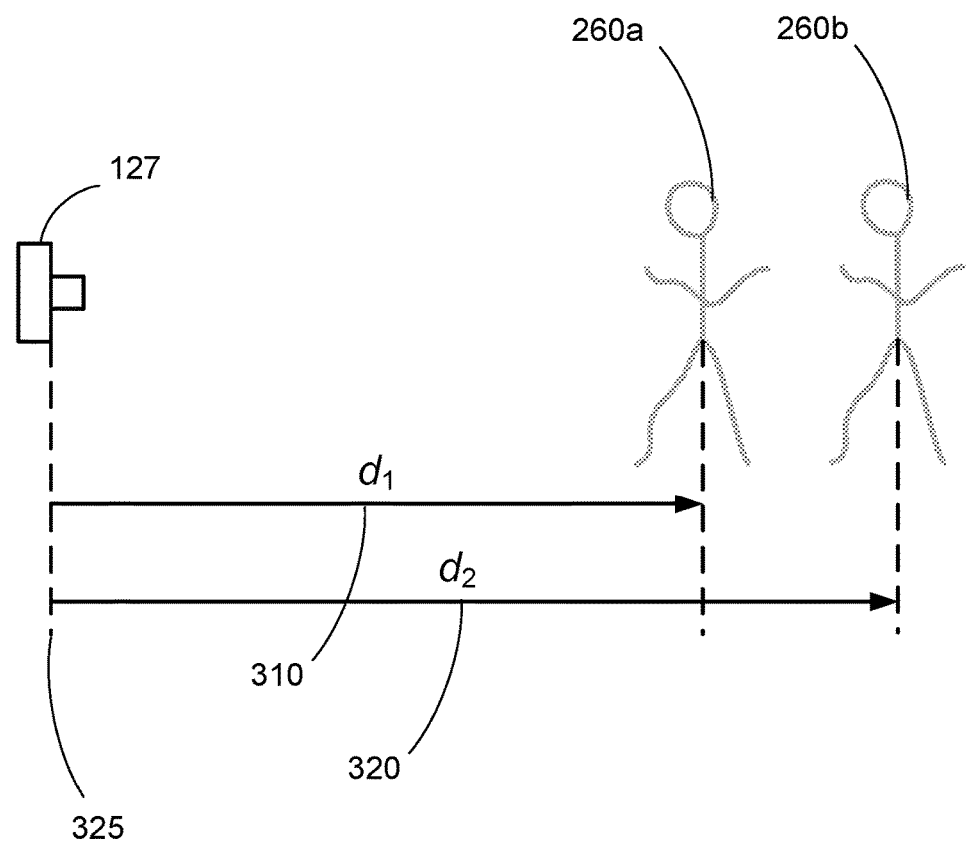
FIG. 3 is a diagram showing the motion of an object between exposures of images.

On the other hand, the object 260 may move axially between the exposures, or the image capture device 101 may move axially between the two exposures, or both the object 260 and the image capture device 101 may move axially between the exposures. Without loss of generality, consider the case where the object 260 moves axially between the exposures. FIG. 3 shows an example where the object 260 is at a first position 260a, at a depth $d_1$ 310 from the image capture device 101, for the first exposure, and at a second position 260b, at a depth $d_2$ 320 from the image capture device 101, for the second exposure. The object 260 is axially displaced in the scene between the captured images 200 and 210 with respect to a sensor plane 325 of the image capture device 101. The depth $d_1$ 310 and the depth $d_2$ 320 are defined to be motion values of the object 260. A third motion value is given by the distance the object moves between the exposures, $d_2-d_1$. The set of three motion values $\{d_1, d_2, d_2-d_1\}$ is fully defined by knowing any two of the three motion values.

To characterise the depth of the axially moving object 260 from the image capture device 127, it is necessary to determine either $d_1$ 310 or $d_2$ 320. The full set of motion values $\{d_1, d_2, d_2-d_1\}$ may be determined. The full set of motion values allows the depth of the object 260 to be specified for either the first image 200 or the second image 210. The motion values identify the depths of the object in the first 200 and second 210 captured images and the axial motion of the object 260 in the scene.

The axial motion of the object 260 from the first position 260a to the second position 260b results in a variation in the focus blur of the object, even if the camera parameters are held fixed. The captured images 200 and 210 include a variation in blur between the first 200 and second 210 captured images, where the variation in the blur is caused by the motion of the object between capturing the first and second image. The variation in focus blur attributable to the motion of the object 260 may be termed the "motion focus bracket". The combination of the camera focus bracket and the motion focus bracket produces an "effective focus bracket". The effective focus bracket describes the change in focus blur of the object 260 from the first image 200 where the object is at position 260a, at depth $d_1$ 310 from the image capture device 127, to the second image 210 where the object is at position 260b, at depth $d_2$ 320 from the image capture device 101.

To determine the depth $d_1$ 310 of the object in the first image 200, or the depth $d_2$ 320 of the object in the second image 210, from the spectral ratio, the effective focus bracket is required. Knowledge of only the camera focus bracket does not allow the correct calibration relationship between the spectral ratio and object depth to be determined. In other words, if using a calibration specific to the known camera focus bracket, then the existence of axial motion biases the depth d estimated from the spectral ratio. However, the effective focus bracket depends on the motion values $\{d_1, d_2, d_2\text{-}d_1\}$, none of which are known.

To overcome the problem of not knowing the motion values $\{d_1, d_2, d_2\text{-}d_1\}$, an additional parameter is required, so that the effective focus bracket can be determined, or equivalently so that the set of motion values $\{d_1, d_2, d_2\text{-}d_1\}$ can be determined. An additional parameter can be determined by determining the change in scale $\Delta s$ of the object 260 between the first image 200 and the second image 210. If $d_2 > d_1$, then the object will appear smaller in the second image 210 than in the first image 200. Conversely, if $d_2 < d_1$, then the object will appear larger in the second image 210 than in the first image 200. The scale change $\Delta s$ may be measured by performing an alignment operation on the image patches 240 and 250. The alignment operation may be an affine alignment, or a rotation/scale/translation (RST) alignment, or some other alignment operation. Many such alignment operations, which produce a scale change measurement $\Delta s$, are known. The scale change measurement $\Delta s$ may be expressed as a ratio of the apparent sizes of the object 260 in the image patches 240 and 250.

If the scale change $\Delta s$ is significant, then one of the image patches 240 or 250 may be rescaled using an image scaling algorithm so that the apparent sizes of the object 260 in the image patches 240 and 250 are brought into alignment, before calculating the spectral ratio of the image patches.

The motion values $\{d_1, d_2, d_2\text{-}d_1\}$ depend on both the shape of the spectral ratio and the magnitude of the scale change $\Delta s$. To determine the motion values $\{d_1, d_2, d_2\text{-}d_1\}$, a calibration mapping the shape of the spectral ratio to depth for each possible value of scale change $\Delta s$ is required. When $\Delta s=1.0$, the object 260 has not moved axially between exposures, $d_1$ is equal to $d_2$, and the calibration mapping is the same as the calibration assuming no object motion. When $\Delta s \neq 1.0$, the object 260 has moved axially between exposures, $d_1$ is not equal to $d_2$, and a different calibration, depending on the value of $\Delta s$, is required. Methods 600 and 700 of determining calibrations are described below with reference to FIGS. 6 and 7.

In the case where the motion of the image capture device 101 or object 260 is a combination of lateral and axial motion, the lateral motion can be dealt with by translational image alignment methods, while the axial motion is dealt with using the methods described above.

Figure 4:
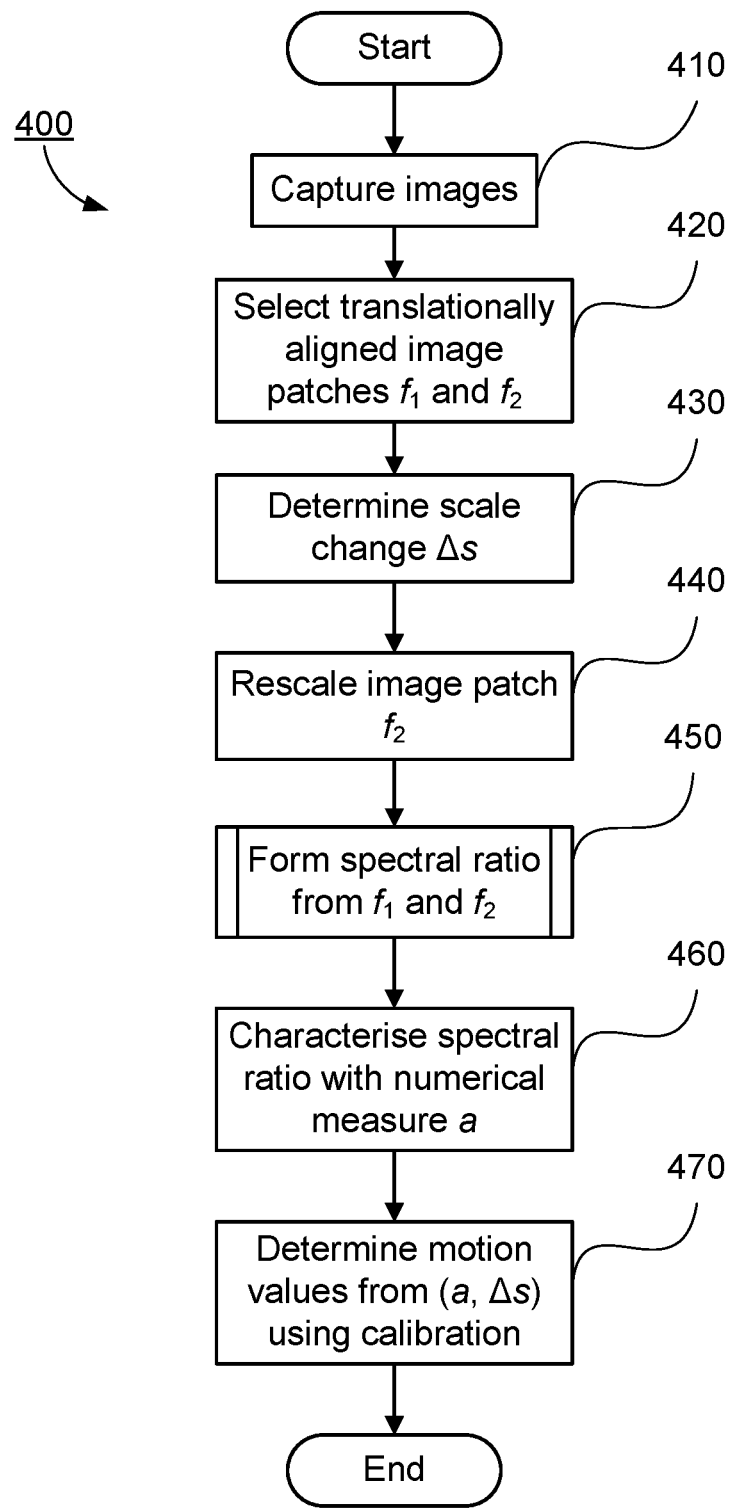
FIG. 4 is a schematic flow diagram illustrating a method of determining motion values of an object.

The method 400 of determining motion values of an object will now be described with reference to FIG. 4. The method 400 may be referred to as "a depth estimation process". The method 400 will be described by way of example with reference to the images 200 and 210 of FIGS. 2A and 2B, respectively, and the object 260 where the method 400 is implemented on the image capture device 101 of FIGS. 1A and 1B. The method 400 is implemented as one or more software code modules of the software application program 133 resident on the ROM 160 and being controlled in its execution by the processor 105. The determined motion values characterise the depth of the object 260 in the scene represented by the images 200 and 210.

Figure 2B:
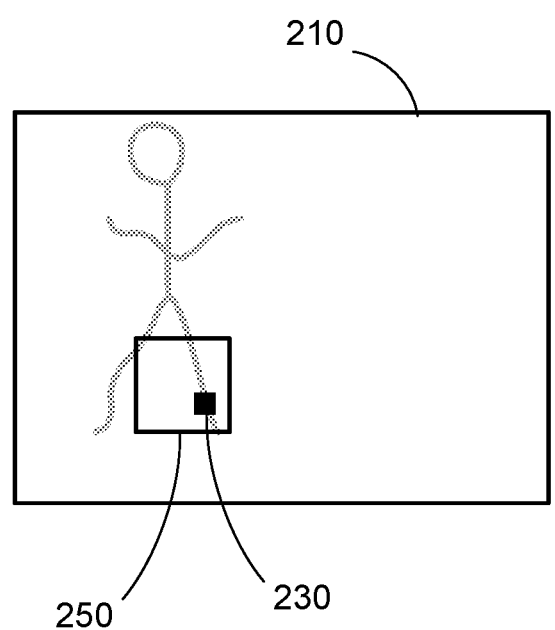

The method 400 begins with an image capture step 410, in which two or more images of a scene are captured by the image capture device 101. From the two or more images captured, two images 200 and 210 are selected in the example of FIGS. 2A and 2B. The images 200 and 210 capture common parts of the scene. In the example of FIGS. 2A and 2B, the device 101 is used for capturing the first image 200 and second image 210 of the object 260 in the scene. The images 200 and 210 may be captured with different settings of image capture device parameters (or camera parameters) that affect the amount of lens blur, such as focus, aperture, or zoom.

In a patch selection step 420, image patches $f_1$ 240 and $f_2$ 250 are selected, or identified, from the two images 200 and 210. Corresponding pixels 220 and 230 in the selected image patches 240 and 250, respectively, substantially represent the same point in the scene being imaged. Selecting the image patches 240 and 250 so that the corresponding pixels 220 and 230 represent the same point in the scene may be achieved by locally translationally aligning the two images 200 and 210 using a method such as optical flow or correlation-based alignment. The selected image patches $f_1$ 240 and $f_2$ 250 may be stored in the memory 106.

In scale change determining step 430, the scale change $\Delta s$ between the image patches $f_1$ 240 and $f_2$ 250 is determined under execution of the processor 105. One method of determining the scale change $\Delta s$ is to estimate rotation, scaling, and translation (RST) by calculating the Fourier magnitude of both image patches 240 and 250 (which is a translation invariant); transforming the Fourier magnitude onto a log-polar $(\log r, \theta)$ coordinate system (in which image rotation and image scaling become translations) to produce two log-polar images; correlating the two log-polar images to yield a correlation peak at a position which gives a relative scaling and rotation between the two images, accordingly transforming one of the images by rotation and scaling; and performing another correlation to determine a relative translation between the two images 200 and 210. Alternatively determining the scale change $\Delta s$ may be performed using some other form of RST alignment or affine alignment. Such alignment methods produce a measure of the change in scale between two images, which is assigned to the scale change $\Delta s$.

In rescaling step 440, the image patch $f_2$ 250 is rescaled using the scale change $\Delta s$, to bring the patch substantially into alignment with the image patch $f_1$ 240, accounting for the scale difference. Alternatively, the image patch $f_1$ 240 may be rescaled using the scale change $\Delta s$, to bring the patch substantially into alignment with the image patch $f_2$ 250, accounting for the scale difference. The rescaling may be performed at step 440 using a method such as cubic resampling, sinc resampling or Fourier scaling, or any other such method known in the art. The rescaled image patch $f_2$ 250 may be stored in the RAM 170 under execution of the processor 105.

In spectral ratio step 450, the spectral ratio $F_1/F_2$ is formed from the image patches $f_1$ 240 and $f_2$ 250, under execution of the processor 105, where one of the image patches $f_1$ 240 and $f_2$ 250 may have been previously rescaled by the rescaling step 440. A method 500 of forming the spectral ratio $F_1/F_2$, as executed at step 450, will be described in detail below with reference to FIG. 5. The determined spectral ratio $F_1/F_2$ may be stored in the RAM 170.

In spectral ratio characterising step 460, the spectral ratio is characterised to determine a numerical measure a. The spectral ratio may be characterised at step 460 using any of the methods described above for characterising the shape of the spectral ratio.

In motion value determining step 470, the scale change $\Delta s$ and numerical measure a are used to determine at least two of the set of motion values $\{d_1, d_2, d_2\text{-}d_1\}$ characterising the depth of the object 260 in the scene. The motion values are determined at step 470 with reference to a calibration. The calibration used at step 470 may be previously determined or may be determined after image capture at step 410. The calibration may be derived experimentally or theoretically.

Depending on the nature of the calibration, determining the motion values from the calibration may involve cross-referencing the scale change Δs and numerical measure a in a look-up table, interpolating motion values from a look-up table, calculating motion values from a parametric relationship involving the scale change Δs and numerical measure a, solving a system of equations for motion values iteratively to converge on the measured scale change Δs and numerical measure a, or some combination of these methods, or other methods as governed by the nature of the calibration.

Figure 6:
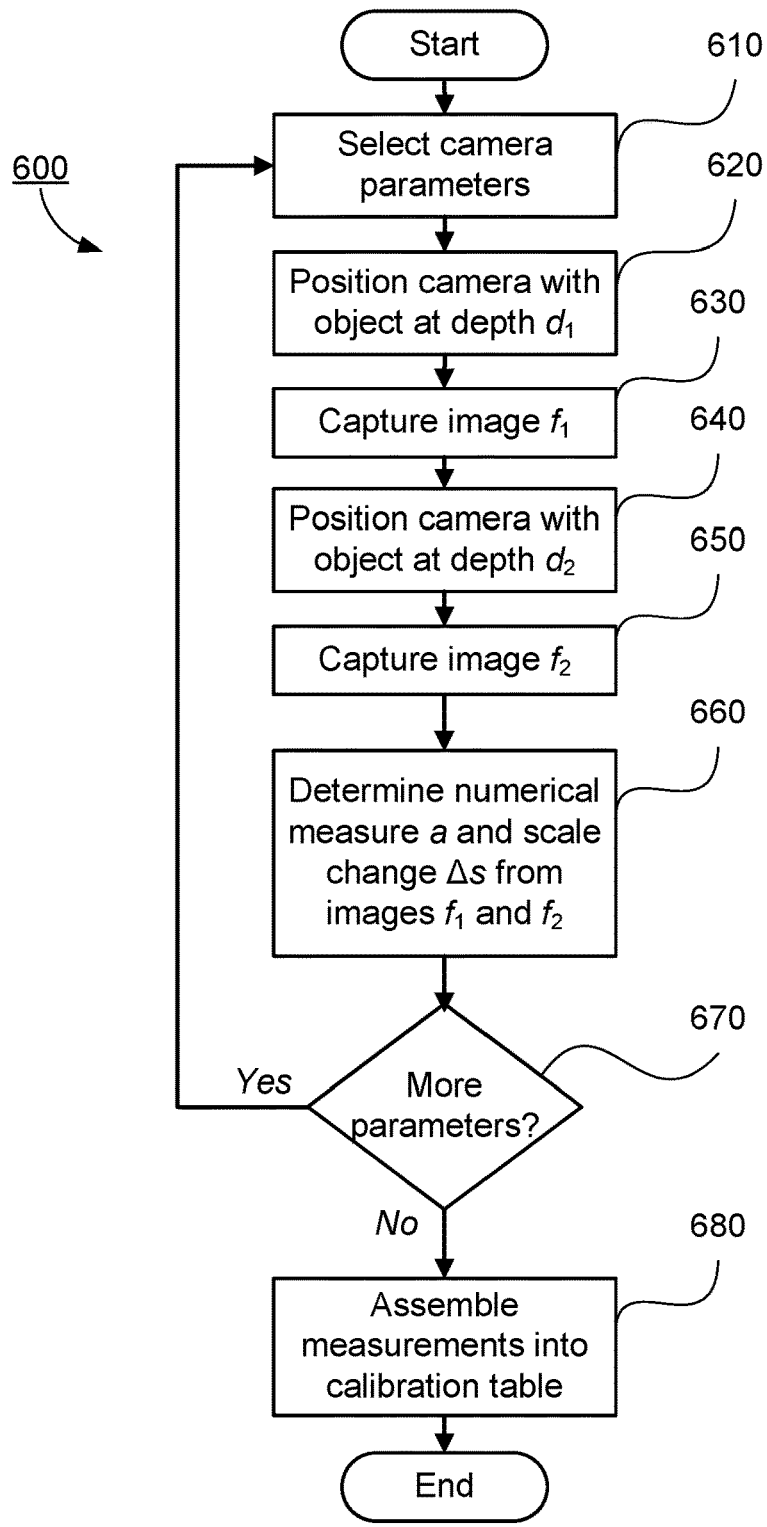
FIG. 6 is a schematic flow diagram showing a method of determining a calibration, as used in the method of FIG. 4.

The method 600 of determining a calibration will be described in detail below with reference to FIG. 6. The calibration determined in accordance with the method 600 may be used at step 470 in determining the motion values.

Figure 5:
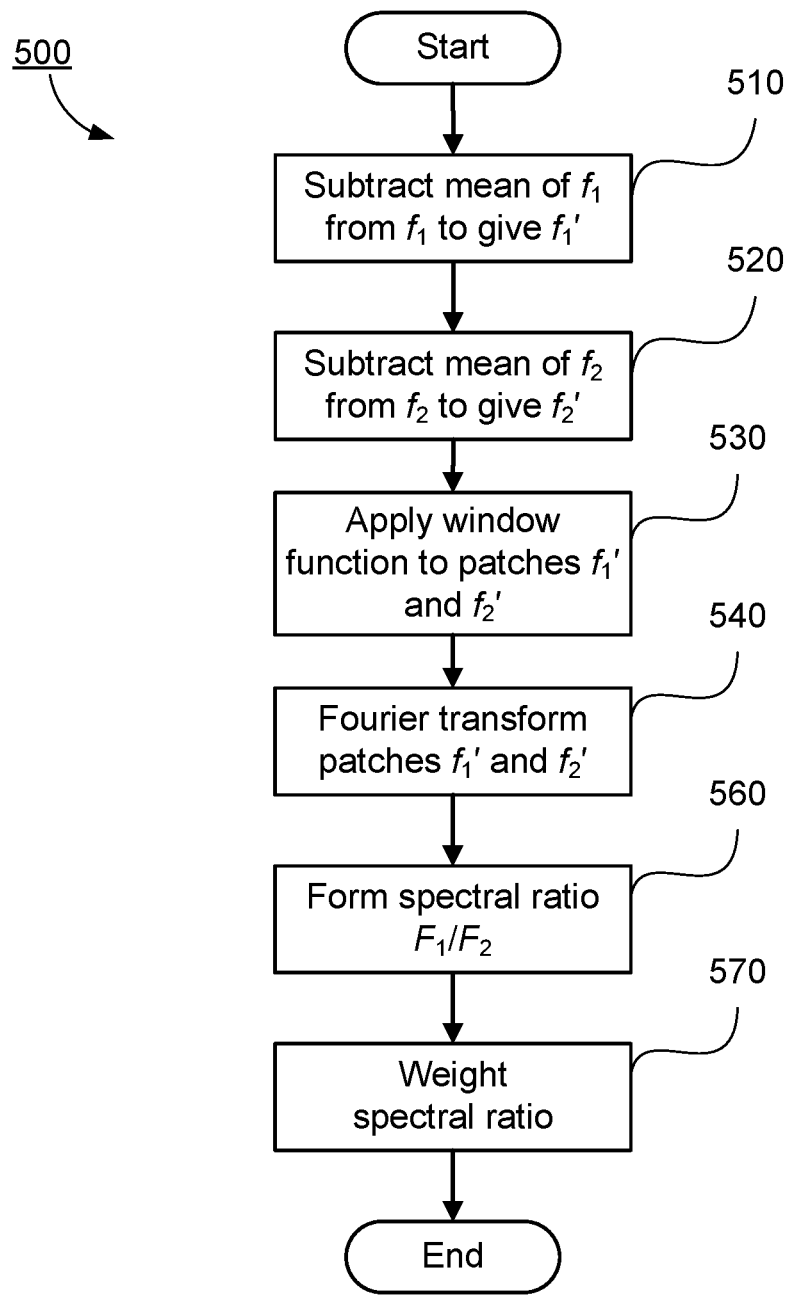
FIG. 5 is a schematic flow diagram showing a method of forming a spectral ratio, as used in the method of FIG. 4.

The method 500 of forming the spectral ratio $F_1/F_2$, as executed at step 450, will now be described with reference to FIG. 5. The method 500 will be described by way of example with reference to the images 200 and 210 and the image patches $f_1$ 240 and $f_2$ 250. The method 500 may be implemented as one or more software code modules of the software application program 133 resident on the ROM 160 and being controlled in its execution by the processor 105.

The method 500 begins with the input patch $f_1$ 240 and input patch $f_2$ 250 as data inputs, as defined by earlier processing steps. In a first zero mean step 510, the mean value of the pixel values in the first input patch $f_1$ 240 is determined, and the mean value determined at step 510 is then subtracted from the pixel values of all of the pixels in the first input patch $f_1$ 240. The result of the determination at step 510 is a first zero mean patch, designated $f_1'$.

In a second zero mean step 520, the mean value of the pixel values in the second input patch $f_2$ 250 is determined. The mean value determined at step 520 is then subtracted from the pixel values of all of the pixels in the second input patch $f_2$ 250. The result of the determination at step 520 is a second zero mean patch, designated $f_2'$.

The mean values determined at step 510 and 520 may be stored in the RAM 170, under execution of the processor 105.

In a windowing step 530, the zero mean patches $f_1'$ and $f_2'$ are windowed using a window function that falls to zero or some small value near the edges of the patches $f_1$ 240 and $f_2$ 250. The window functions used at step 530—may include, for example, Hann windows, Hamming windows, and similar functions.

A Fourier transform step 540 follows in which the windowed patches $f_1'$ and $f_2'$ are Fourier transformed using a Fast Fourier Transform (FFT) algorithm, for example, to form Fourier transformed image patches $F_1$ and $F_2$ respectively. The Fourier transformed image patches $F_1$ and $F_2$ formed at step 540 contain complex number values at each spatial frequency sample.

In a spectral ratio forming step 560, the Fourier transformed patches $F_1$ and $F_2$ are divided sample-wise, under execution of the processor 105, to form the spectral ratio image patch $F_2/F_1$, using complex number division. The DC spatial frequency sample in the spectral ratio is a special case and is set to unity.

An optional weighting step 570 may then optionally be performed, where the spatial frequency samples in the spectral ratio are assigned weights. The weights may be assigned using any of the methods described above for weighting samples in the spectral ratio.

The method 600 of determining a calibration for use in motion value determining step 470 will now be described with reference to FIG. 6. The method 600 may be implemented as one or more software code modules of the software application program 133 resident on the ROM 160 and being controlled in its execution by the processor 105.

The method 600 begins with a camera parameter selecting step 610, in which a set of camera parameters are selected for the device 101 under execution of the processor 105. The parameters may include settings such as focal length, aperture, focus position, ISO speed, and other settings of the image capture device 101. The selected camera parameters include a choice of camera focus bracket, comprising a choice of parameters for a first image capture and a choice of parameters for a second image capture such that the focus is different in the two images.

In a first positioning step 620, the device 101 and a test object are positioned, with the object positioned in the field of view of the device 101 and at a known depth $d_1$ from the device 101. The parameters of the device 101 are set, under execution of the processor 105, to the camera parameters selected in camera parameter selecting step 610. In particular, the camera focus position is set to the focus position for the first image capture.

In a first image capture step 630, an image $f_1$ of the object is captured under execution of the processor 105.

In a second positioning step 640, the device 101 and the test object are positioned, with the object positioned in the field of view of the device 101 and at a known depth $d_2$ from the device 101. The camera parameters of the device 101 are set to the camera parameters selected in camera parameter selecting step 610. In particular, the focus position of the device 101 is set to the focus position for the second image capture. The motion of the object from depth $d_1$ to depth $d_2$ may be determined, for example, by moving the object or the device 101 axially in a controlled fashion.

In a second image capture step 650, an image $f_2$ of the object is captured under execution of the processor 105.

In a measurement determination step 660, the scale change Δs of the object between the two images $f_1$ and $f_2$ is determined, and the numerical measure a characterising the shape of the spectral ratio of the object is determined. The numerical measure a is determined in a manner corresponding to the method to be used in depth estimation method 400, using image patches of corresponding size.

In a decision step 670, a decision is made on whether to capture more images with different parameters or object depths. If more images with different parameters or object depths are to be captured, the method 600 returns to camera parameter selecting step 610. If no more images with different parameters or object depths are to be captured, the method 600 continues to assembly step 680.

In an assembly step 680, the measured scale changes Δs of the object and the numerical measures a characterising the shapes of the spectral ratio for each pair of captured images $f_1$ and $f_2$, are assembled under execution of the processor 105. The measured scale changes Δs of the object and the numerical measures a determined at step 680 are assembled into a calibration table, configured within ROM 170, based on the corresponding set of camera parameters and object positions $d_1$ and $d_2$. For example, the measurements may be assembled into a look-up table such that, given two images of an object such as the object 260 captured with known camera parameters, the scale change Δs of the object and the numerical measure a characterising the shape of the spectral ratio for that object may be measured, then the corresponding object positions $d_1$ and $d_2$ may be determined from the look-up table. The set of motion values $\{d_1, d_2, d_2-d_1\}$ characterising the depth of the object 260 in the scene may be determined using the corresponding object positions $d_1$ and $d_2$. Determining the corresponding object positions $d_1$ and $d_2$ from the look-up table may involve interpolation of values in the look-up table.

Figure 7:
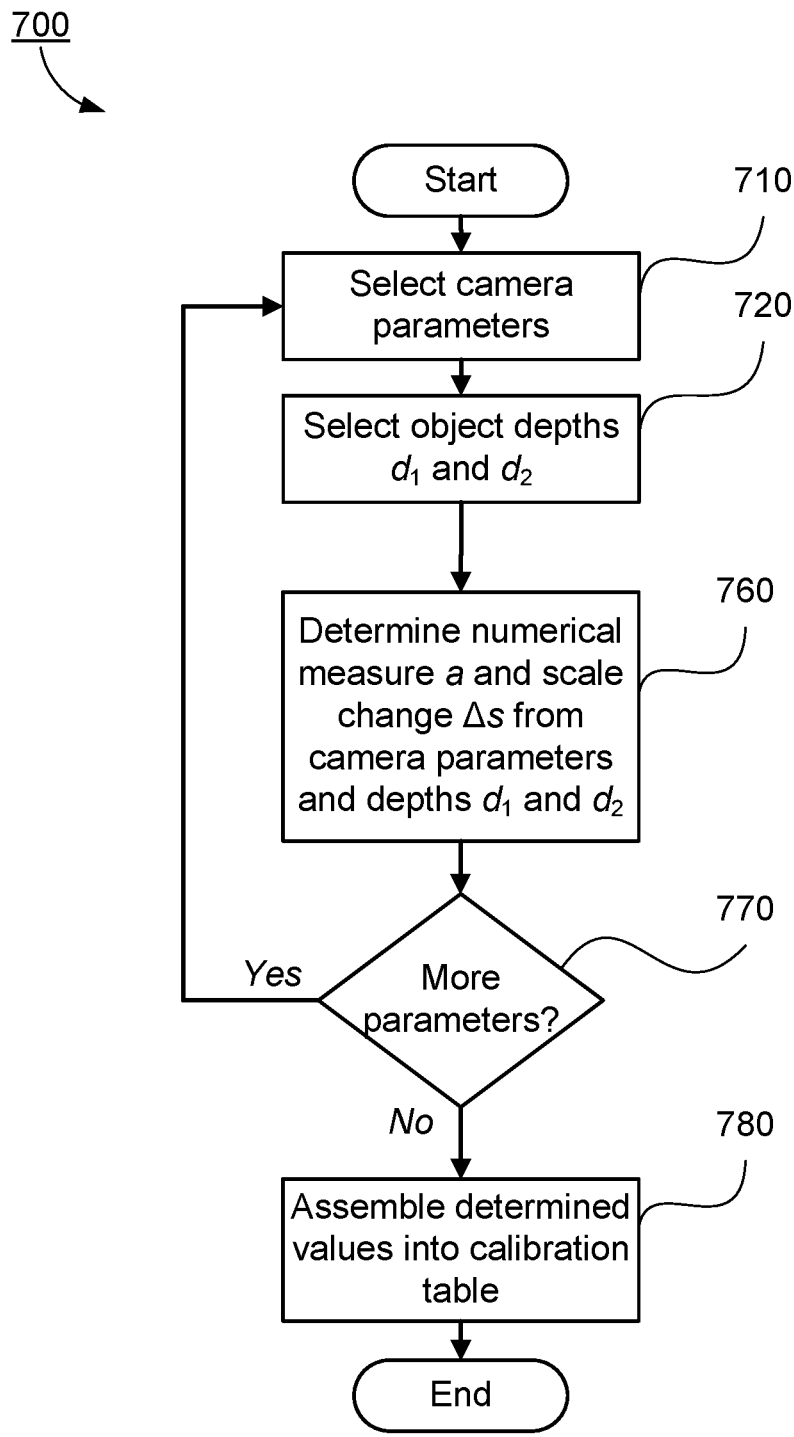
FIG. 7 is a schematic flow diagram showing an alternative method of determining a calibration, as used in the method of FIG. 4.

The method 700 of determining a calibration suitable for use in motion value determining step 470 will now be described with reference to FIG. 7. The method 700 may be referred to as a theoretical calibration process 700. The method 700 may be implemented as one or more software code modules of the software application program 133 resident on the ROM 160 and being controlled in its execution by the processor 105.

The method 700 determines a calibration by determining values, from principles of optics, for scale change $\Delta s$ and numerical measure a characterising the shape of the spectral ratio. The method 700 may be performed prior to capture of images to be used for depth estimation, for example, during the image capture device design process. Alternatively, the method 700 may be performed after the capture of images to be used for depth estimation, for example, in the processor 105 in the camera. In still another alternative, the method 700 may be performed by a computer device as a post-processing step.

The method 700 begins with a camera parameter selecting step 710, in which a set of camera parameters are selected for the device 101 under execution of the processor 105. The parameters may include settings such as focal length, aperture, focus position, ISO speed, and other settings of a notional camera. In particular, the parameters selected at step 710 include a choice of camera focus bracket, comprising a choice of parameters for a notional first image capture and a choice of parameters for a notional second image capture such that the focus is different in the two notional images.

In a depth selection step 720, object depths $d_1$ and $d_2$ are selected under execution of the processor 105. The object depths $d_1$ and $d_2$ represent a set of motion values $\{d_2, d_2, d_2-d_1\}$ notionally characterising the depth of an object from a camera.

In a measurement determination step 760, the scale change $\Delta s$ of the notional object between two notional images $f_1$ and $f_2$ is determined, and the numerical measure a characterising the shape of the spectral ratio of the object is determined. The scale change may be determined using geometrical optics, and can be shown to be $\Delta s = d_1/d_2$ in the geometrical optics approximation. Alternatively, the scale change may be determined using more precise optical modelling. The numerical measure a may be determined by determining the optical transfer function (OTF) as a function of spatial frequency for the camera parameters of the first notional image, determining the optical transfer function (OTF) as a function of spatial frequency for the camera parameters of the second notional image, and then forming the ratio of these two optical transfer function (OTFs) to form a theoretical spectral ratio as a function of spatial frequency. The theoretical spectral ratio can then be characterised in a similar way to the measured spectral ratio samples from images to give a numerical measure a characterising the shape of the spectral ratio. For example, the theoretical spectral ratio may be sampled at spatial frequency samples corresponding to a camera image sensor, then treated as a measured spectral ratio and characterised as described above.

In a decision step 770, a decision is made on whether to determine more measurements with different parameters or object depths. If more measurements corresponding to different parameters or object depths are to be determined, the theoretical method 700 returns to camera parameter selecting step 710. If no more measurements corresponding to different parameters or object depths are to be determined, the method 700 continues to assembly step 780.

In an assembly step 780, the determined scale changes $\Delta s$ of the notional object and the numerical measures a characterising the shapes of the spectral ratio for each pair of notional images $f_1$ and $f_2$, are assembled under execution of the processor 105. The scale changes $\Delta s$ and the numerical measures a determined at step 780 are assembled into a calibration table, configured within ROM 170, based on the corresponding set of camera parameters and notional object positions $d_1$ and $d_2$. For example, the measurements may be assembled into a look-up table such that, given two images of an object such as the object 260 captured with known camera parameters, the scale change $\Delta s$ of the object and the numerical measure a characterising the shape of the spectral ratio for that object may be measured, then the corresponding object positions $d_1$ and $d_2$ may be determined from the look-up table. The set of motion values $\{d_1, d_2, d_2-d_1\}$ characterising the depth of the object 260 in the scene may be determined using the corresponding object positions $d_1$ and $d_2$. Determining the corresponding object positions $d_1$ and $d_2$ from the look-up table may involve interpolation of values in the look-up table.

In an alternative arrangement, three or more images may be captured to avoid any ambiguities in the determination of the set of motion values $\{d_1, d_2, d_2-d_1\}$ characterising the depth of the object 260 in the scene from the calibration. For example, a third image of the object 260 in the scene may be captured for use in determining the set of motion values $\{d_1, d_2, d_2-d_1\}$. The calibration for a given set of camera parameters mapping a measured scale change $\Delta s$ and a numerical measure a characterising the shape of a spectral ratio to a set of motion values can result in an ambiguity. For example, it may not be possible to distinguish between different possible values for $d_1$, or different possible values for $d_2$. Such an ambiguity depends on the camera parameters, and in particular the camera focus bracket.

Figure 8:
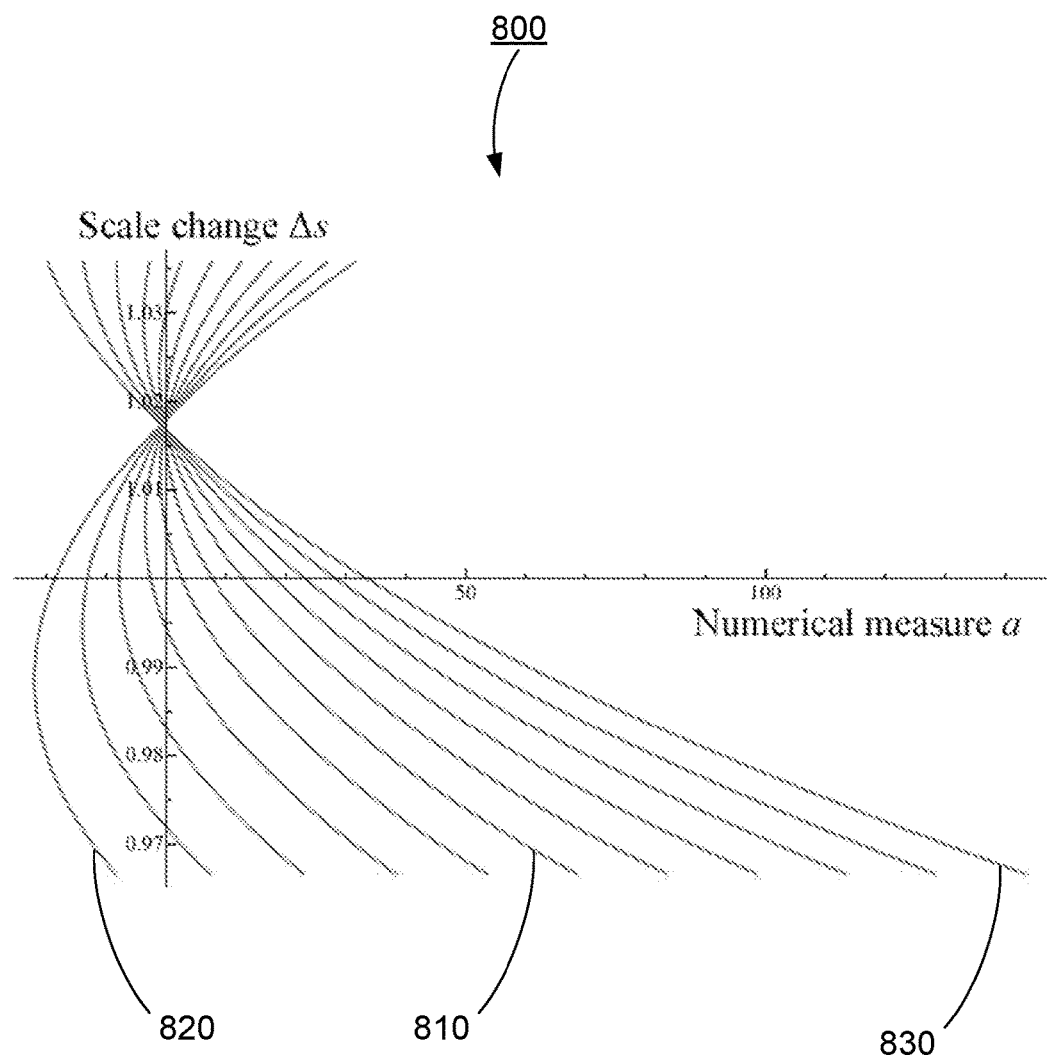
FIG. 8 is a plot showing a relationship between scale change and numerical measure of the spectral ratio for various sets of object motion values.

FIG. 8 shows a plot which illustrates an ambiguity in the determination of the set of motion values $\{d_1, d_2, d_2-d_1\}$. The plot of FIG. 8 is an example of a theoretical calibration 800, derived as described above, for a given set of chosen camera parameters. The theoretical calibration 800 shows a plot of several loci. Each locus represents the scale change $\Delta s$ of an object and the numerical measure a characterising the shape of the spectral ratio for that object, for a given value of depth $d_1$ 310 in a first image, as the value of the depth $d_2$ 320 in the second image varies, or for varying amounts of axial motion. A first locus 810 shows the locus of values for an object which is in sharp focus in the first image (i.e. the depth $d_1$ 310 is equal to the depth of best focus for the chosen camera parameters). A second locus 820 shows the locus of values for an object which is closer to the device 101 than the object described by the first locus 810 (i.e. the depth $d_1$ 310 is less than the depth of best focus for the selected camera parameters). A third locus 830 shows the locus of values for an object which is further from the device 101 than the object described by the first locus 810 (i.e. the depth $d_1$ 310 is greater than the depth of best focus for the selected camera parameters). The other loci represent objects at intermediate depths.

To determine the depth $d_1$ 310 using the calibration, given measured values for the scale change $\Delta s$ of an object and the numerical measure a characterising the shape of the spectral ratio for that object, it is necessary to determine which locus the values $\{\Delta s, a\}$ fall on. In many cases, it can be determined which locus the values $\{\Delta s, a\}$ fall on. However, as seen in FIG. 8, the loci 810, 820, 830, and the other unnumbered loci all intersect at one point. For the set of measured values {Δs, a} corresponding to the intersection point of the loci, it is not possible to determine which locus the values fall on, and so it is not possible to determine the depth $d_1$ 310 from the calibration. To avoid such a problem, the device 101 may capture three or more images of the scene, with different camera parameters for each capture. Given a set of three images $f_1$, $f_2$, and $f_3$, all captured with different camera parameters that affect the focus, each of the image pairs $\{f_1, f_2\}$, $\{f_1, f_3\}$, and $\{f_2, f_3\}$ constitutes an image pair for which depth from defocus (DFD) may be practised using the methods described above. If an object captured in the images is moving axially, then it may be the case that one of the image pairs, such as the image pair $\{f_1, f_2\}$ without loss of generality, produces an ambiguity as described above, making it impossible to determine the distances $d_1$ or $d_2$ from the image pair. In such a case, the variation in camera focus bracket provided by the other two image pairs $\{f_1, f_3\}$, and $\{f_2, f_3\}$ may allow the determination of the distances $\{d_1, d_3\}$, and $\{d_2, d_3\}$ respectively using the methods described above. Thus, by capturing three or more images, a determination of the set of motion values $\{d_1, d_2, d_2-d_1\}$ characterising the depth of the object 260 in the scene may be made.

In an example use of the depth estimating method 400 described above, a depth map of a scene may be determined. In this example, depth estimation is practised on the input images 200 and 210 on a patch by patch basis by iterating the steps 420 to 470 of the method 400, selecting successive pairs of aligned image patches $f_1$ 240 and $f_2$ 250 in patch selection step 420, such that the set of selected patches substantially covers the common parts of the scene captured by the input images 200 and 210. For example, the patches may be selected by iterating across rows and then down columns of the first input image 200 to select successive instances of image patch $f_1$ 240, and then selecting a suitable locally aligned image patch $f_2$ 250 from the second input image 210, as described in patch selection step 420. If no suitable locally aligned image patch $f_2$ 250 from the second input image 210 is available, for example if the image patch $f_1$ 240 depicts an object which has moved outside the view of the second input image 210, the image patch $f_1$ 240 may be skipped.

After motion values have been determined for the successive pairs of aligned image patches $f_1$ 240 and $f_2$ 250 by iterating the steps 420 to 470 for each of the successive pairs of patches, the resulting motion values may then be assembled into a depth map of the scene. For example, if the image patches were selected by iterating across rows and then down columns of the first input image 200, the motion values for each patch may be assembled in a corresponding fashion, iterating across rows and down columns to form either a depth map of the scene as captured in the first image 200, or a depth map of the scene as captured in the second image 210, or both. Additionally, the motion values may be used to assemble a map showing the amounts of axial motion of various objects in the scene.

INDUSTRIAL APPLICABILITY

The arrangements described are applicable to the computer and data processing industries and particularly for the image processing industry.

The foregoing describes only some embodiments of the present invention, and modifications and/or changes can be made thereto without departing from the scope and spirit of the invention, the embodiments being illustrative and not restrictive.

The invention claimed is:

1. A method of determining at least two motion values of an object moving axially in a scene, said method comprising:
   capturing a first and second image of the object in the scene with an image capture device, wherein said object is axially displaced in the scene between the captured images with respect to a sensor plane of the image capture device;
   determining a variation in blur between said first and second captured images;
   determining a scale change of the object between said first and second captured images;
   determining, using the determined scale change and variation in blur, at least two motion values of the object in the scene, wherein said motion values identify the depths of the object in the first and second captured images and axial motion of the object in the scene.

2. The method according to claim 1, wherein at least a portion of the variation in blur is caused by a change in image capture device parameters between capturing the first and second image.

3. The method according to claim 1, wherein at least a portion of the variation in blur is caused by motion of the object between capturing the first and second image.

4. The method according to claim 1, further comprising determining scale change and spectral ratio from the images.

5. The method according to claim 1, further comprising determining scale change and spectral ratio using optical modelling.

6. The method according to claim 1, wherein the method is performed during design of an image capture device.

7. The method according to claim 1, wherein the method is performed after image capture.

8. The method according to claim 1, further comprising capturing a third image of the object in the scene.

9. A system for determining at least two motion values of an object moving axially in a scene, said system comprising:
   a memory for storing data and a computer program;
   a processor coupled to said memory for executing said computer program, said computer program comprising instructions for:
   capturing a first and second image of the object in the scene with an image capture device, wherein said object is axially displaced in the scene between the captured images with respect to a sensor plane of the image capture device;
   determining a variation in blur between said first and second captured images;
   determining a scale change of the object between said first and second captured images;
   determining, using the determined scale change and variation in blur, at least two motion values of the object in the scene, wherein said motion values identify the depths of the object in the first and second captured images and axial motion of the object in the scene.

10. An apparatus for determining at least two motion values of an object moving axially in a scene, said apparatus comprising:
   means for capturing a first and second image of the object in the scene with an image capture device, wherein said object is axially displaced in the scene between the captured images with respect to a sensor plane of the image capture device;

means for determining a variation in blur between said first and second captured images;

means for determining a scale change of the object between said first and second captured images; and means for determining, using the determined scale change and variation in blur, at least two motion values of the object in the scene, wherein said motion values identify the depths of the object in the first and second captured images and axial motion of the object in the scene.

11. A non-transitory computer readable medium having a computer program stored thereon for determining at least two motion values of an object moving axially in a scene, said program comprising:

code for capturing a first and second image of the object in the scene with an image capture device, wherein said object is axially displaced in the scene between the captured images with respect to a sensor plane of the image capture device;

code for determining a variation in blur between said first and second captured images;

code for determining a scale change of the object between said first and second captured images; and code for determining, using the determined scale change and variation in blur, at least two motion values of the object in the scene, wherein said motion values identify the depths of the object in the first and second captured images and axial motion of the object in the scene.

* * * * *